United States Patent [19]
Baumgarten

[11] 3,827,452
[45] Aug. 6, 1974

[54] AUTOMATIC SHUT-OFF VALVE

[75] Inventor: Carl B. Baumgarten, Houston, Tex.

[73] Assignee: Gemco Manufacturing Corp., Buffalo, N.Y.

[22] Filed: Sept. 25, 1972

[21] Appl. No.: 291,816

[52] U.S. Cl.................. 137/205, 137/202, 137/433
[51] Int. Cl.......................... F16k 31/22, B67c 3/16
[58] Field of Search...... 137/202, 205, 433, 599.1; 141/59

[56] References Cited
UNITED STATES PATENTS

| | | | |
|---|---|---|---|
| 2,284,166 | 5/1942 | Pye | 141/59 X |
| 2,388,481 | 11/1945 | Green | 137/202 |
| 2,590,386 | 3/1952 | Dobrick | 137/433 X |
| 3,273,514 | 9/1966 | Bender | 137/933 X |
| 3,601,140 | 8/1971 | Hooper | 137/205 |
| 3,612,089 | 10/1971 | Beguirstain | 137/205 |

Primary Examiner—Alan Cohan
Attorney, Agent, or Firm—Kenneth H. Johnson

[57] ABSTRACT

An automatic shut-off valve having an emergency by-pass for use with vacuum systems is disclosed. Vacuum systems are frequently used to suction off or handle liquids, yet the vacuum pump or some additional part of the system is not adapted to handle liquids. The present valve operates to automatically shut off the passage to the pump when a liquid floods the automatic shut-off valve which is located at some point in the vacuum system prior to the pump. When the automatic shut-off valve is flooded, a flotation needle-like valve is forced into the passage leading onto the pump, thus blocking it. The needle valve can be more securely seated by a series of barbs which are designed to prevent its downward movement. If the suction is more important than the system, for example during an operation, a by-pass is provided to circumvent the closed needle valve.

22 Claims, 7 Drawing Figures

PATENTED AUG 6 1974
3,827,452
SHEET 1 OF 2
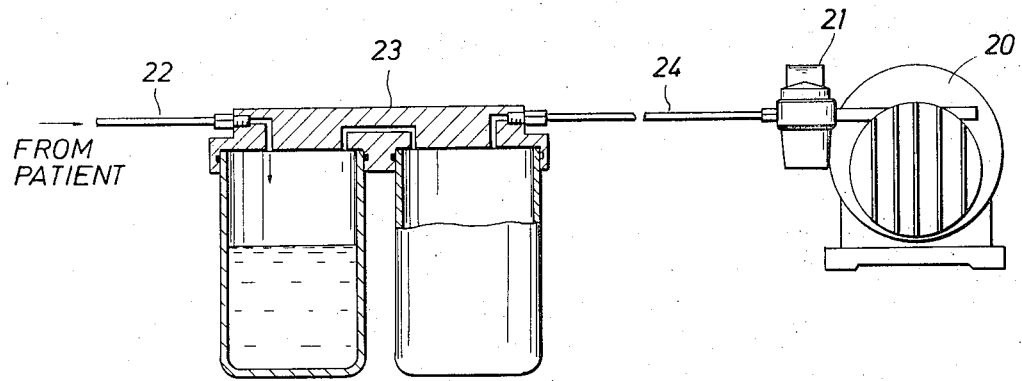
FIG. 1
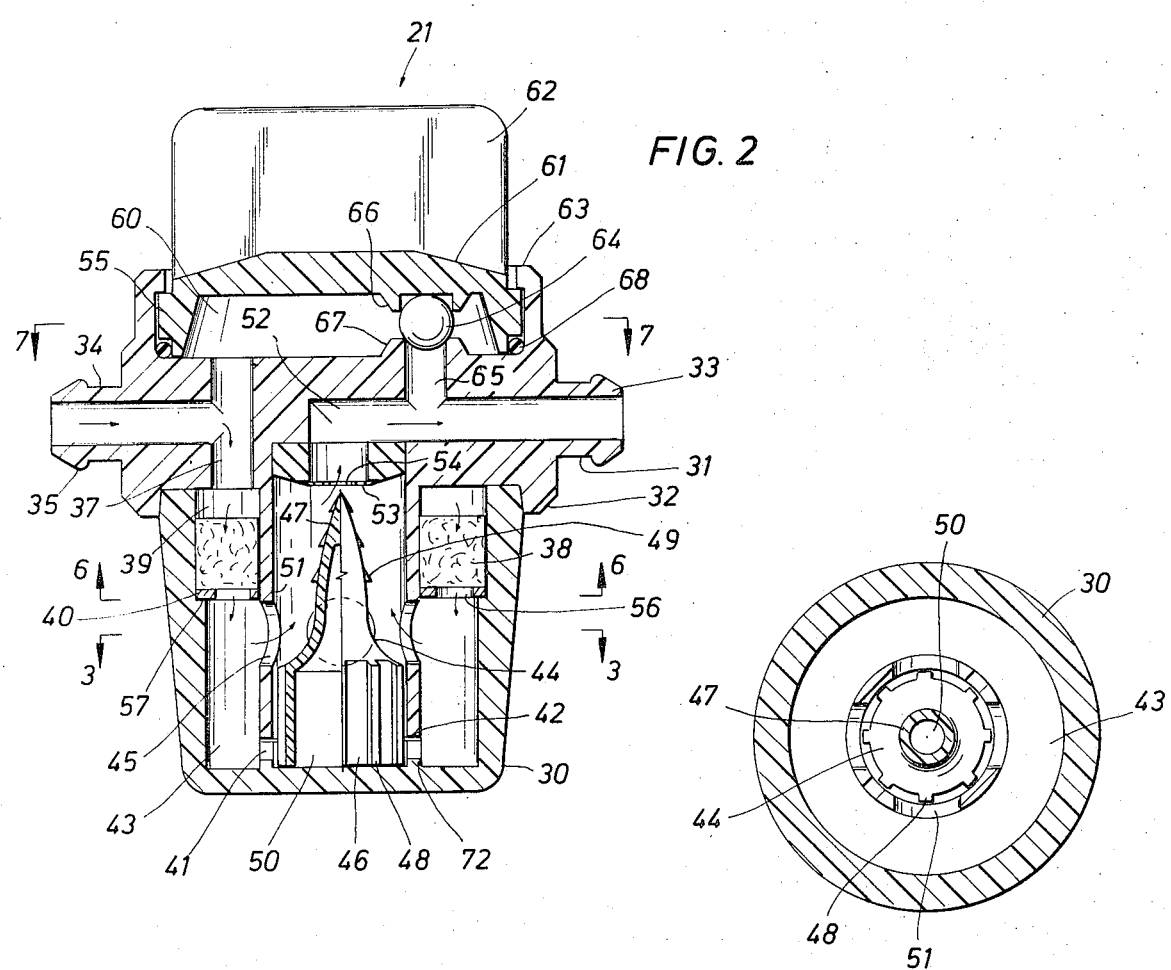
FIG. 2
FIG. 3

3,827,452

AUTOMATIC SHUT-OFF VALVE

BACKGROUND OF THE INVENTION

The present invention relates to and describes an automatic shut-off valve. More particularly, the invention concerns an automatic shut-off valve designed to prevent liquids from inadvertently passing into a vacuum pump or vacuum system.

In many applications, a vacuum pump is employed to draw a liquid out of one location or system to a second location or system. Such vacuum pumps are designed and adapted to handle only gaseous materials such as air, nitrogen, helium, methane, and the like. Thus it is necessary to prevent liquids from reaching the internal mechanism of the pump or from passing beyond a designated point in the vacuum system.

Since vacuum pumps are most efficient when moving a gaseous material, the incursion of a liquid into the pump may reduce the efficiency of the pump and, because of the dissimilar nature of liquids and gases, may result in pump malfunction or total break down at a time when the loss of the pump and the function which it is conducting could result in irreparable harm.

The nature of the liquid being moved by the vacuum created by the pump may also be a strong consideration in preventing contact of the liquid with the pump or introduction of the liquid beyond a particular point in the system. For example, the liquid could be very viscous, have a high or substantial concentration of solids or be very corrosive toward the materials in the pump.

A vacuum pump is generally employed to move a liquid by pulling the vacuum on a closed container which is, in turn, connected to the liquid or location where it is desired to remove or prevent an accumulation of liquid. There could also be a series of such containers or liquid traps. In normal operations when the liquid container or series of liquid containers is filled with liquid, a new container or series of containers is placed into the system and thus the liquid is kept from reaching the pump. Normally the operator of the pump will not allow the containers to fill to the point of flooding. It is the emergency or unexpected distraction which may cause the operator to fail to monitor the operation of the vacuum system and in which the present invention is of great aid. The present invention is also a safety margin between incompetent, inexperienced or inept operation of the system and expensive vacuum equipment.

Even if a particular vacuum pump should continue to function upon being flooded with liquid, the pump discharge is often adapted only to handle a gaseous or particular gaseous material which can then compound the inadvertent flooding into other aspects of the overall operation being conducted.

A particular area of use for vacuum systems and pumps has developed in the medical facilities. The vacuum pumps employed by hospitals are of necessity small and very reliable in that a constant vacuum of specific pressure can be accurately pulled for extended periods of time. The liquid removal is usually very critical since human lives are concerned — for example in the operating room, during an operation where the area of an incision must be kept free or relatively free of liquids in order for the surgeon to be able to efficiently carry out his task. The liquids here concerned are blood and other body fluids (including blood expanders such as glucose or saline solutions) which may occur in the area where the surgeon must see or in other areas where their accumulation is undesirable.

It is often during the unforeseen or emergency occurrences that the vacuum system is forgotten or temporarily neglected by the supportive operating room personnel. The flooding of the vacuum system may go unnoticed until the system fails entirely. Since vacuum pumps are frequently vented to the atmosphere, the liquid may be deposited on other equipment, instruments or the area where the pump is housed.

When the cessation of the pump operation is due to the fouling or overtaxation of the pump mechanism, that particular pump is usually out of order and must be replaced, whereas if the operation of the pump, i.e., the suction, is merely disrupted, by operation of the present invention the function can be restored when the potential flooding situation is relieved. This is a more desirable result and more easily achieved than replacement of the pump. This alternative also, of course, will protect the pump, thereby reducing maintenance and service costs and thereby helping, at least to some small extent, to control hospital costs.

Another specialized area in which the use of vacuum pumps is critical is in laboratories and research facilities, although not to the extent of medical use. In a manner as described above, the vacuum pump or system is used to remove and/or collect a liquid and/or gaseous product. If the operation of a research, testing or analysis system is disrupted by a pump failure or flooding, an entire project may be delayed or the results may be put into question.

Presently no automatic system is available which provides the benefits and advantages of the present invention to the vacuum systems described heretofore.

Almost all vacuum systems provide some means of detouring or terminating the flow of liquids into the pump itself if the various traps placed along the line should fail. Generally these shut-off means are manually operated and are, as a result, often employed after at least some liquid has reached the pump or other critical area of the system.

DESCRIPTION OF THE DRAWINGS

FIG. 1 is an overall view of a vacuum or suction system ready for use, showing the arrangement of the conventional portions of such a system and the relationship of the valve according to the present invention to the system.

FIG. 2 is an enlarged cross sectional view of one embodiment of the present invention.

FIG. 3 is a transverse cross sectional view taken along line 3—3 of FIG. 2.

SUMMARY OF THE INVENTION

Figure 4:
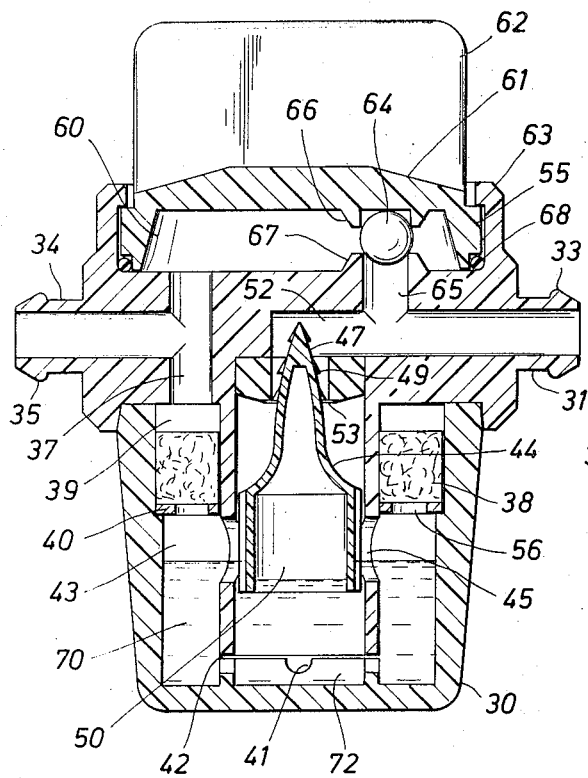
FIG. 4 is an enlarged cross sectional view of the embodiment of FIG. 2 in a second configuration.

The purpose of the present invention is to provide an apparatus which will provide a substantial degree of protection to a vacuum system which is employed in relation to liquids and which is subject to being flooded by such liquids. The present invention, of course, can also be employed in a vacuum system, which is not subject or would not normally be considered subject to flooding by a liquid, since the functioning of the pump or the system is not altered by the use of the present invention which can provide an additional degree of confidence in the system.

The present invention can best be described as an automatic shut-off valve which is actuated by the imminent flooding of the vacuum system to which it is attached. Preferably, the valve of the present invention is contiguously attached to the pump, that is, there is no intervening apparatus or equipment, except tubing or conduits between the valve and the pump. This arrangement is not a critical requirement for the operation of the present valve but is suggested as being the most efficient and economical placement of the valve.

The purpose of the present automatic shut-off valve is to compensate for failure of an operator to adequately monitor the functioning of the vacuum system. Thus, by locating the present automatic shut-off valve at the last possible point in the system prior to the pump, the pump is completely protected and the operator has the longest possible period of time to take remedial action and maintain the action of the pump.

If the operator should fail to take remedial and corrective action, the valve will be activated and, as a result, the system will be shut down. The operator must then either clear the valve, replace the valve or by-pass the valve to restore the functioning of the vacuum system.

The present automatic shut-off valve operates on a flotation principle. As a flooding condition becomes imminent in the vacuum system, the valve, which is situated at some point within the system before the pump, is subjected to this flooding condition. A flotation piece is activated by the flooding of the automatic shut-off valve, and it is seated in the passageway leading to the pump before any liquid reaches the passageway. The flotation piece is designed to be forced into the passageway leading to the pump by the rising liquid and to be firmly seated therein.

This result of a firmly seated flotation piece in the opening of the passage to the pump is achieved by a bullet-shaped projection on the flotation piece that is forced into the opening of the passage to the pump. The projection on the flotation piece need not have a point but may have a configuration corresponding to a portion of an ellipsoid along its longer axis.

Normally the pressure of the liquid and the stricture of the passage into which it is seated will maintain the projection in place and the passage closed. In order to prevent an inadvertent displacement of the projection, however, which could allow liquid to pass into the pump, a further improvement is the use of barb-like structures on the circumference of the projection and a resilient covering partially covering the opening to the passage to the pump, so that as the projection is forced into the opening, the resilient material will distend and allow the projection to pass into and be seated in the passage opening, as previously described, and at the same time at least some of the barbs on the projection will also pass through the resilient material. The barbs are shaped to offer little or minimal resistance to passage up and through the opening but present a flanged surface, such as on an arrowhead, to contact the resilient material and prevent the projection from moving down and out of sealing contact with the passage and the resilient material. The barbs can be arranged about the surface of the projection in a random or patterned manner. A particularly useful configuration would be a series of frusto-conical bands projecting outward from the projection and encircling the projection.

The resilient material at the opening of the passage to the pump is open at its center portion since the gaseous material being pulled by the vacuum pump must pass through this passage. The opening in the resilient member is at least large enough to allow the nose of the projection to pass through. The resilient material may normally be any of those known in the art such as natural rubber, synthetic rubbers such as styrene-butadiene, acrylonitrile-styrene-butadiene, neoprene, polyurethane and the like. The particular resilient material should be non-reactive with the gaseous and liquid materials which may contact it in the operation of the vacuum system.

The bullet-like projection is guided in an upward path by a chamber in which it is located. In order to provide sufficient lifting force from the liquid flooding the chamber of the automatic valve, the chamber has an enlarged configuration and a base portion of the flotation piece is enlarged to occupy a substantial amount of the diameter of the chamber. The projection is mounted on this base portion of the flotation piece and aligned below the opening in the passage to the vacuum pump. In order to maintain the projection on a straight and true course as it is forced upward by the flooding liquid, the circumference of the base of the flotation piece must be the same as that of the chamber in which the flotation piece moves. It has been found, however, that the closeness of the inner wall of the chamber and the outer surface of the base can result in a capillary adhesion or attraction when the liquid comes into the chamber, thus binding the flotation piece and restraining its upward movement, thereby creating the opportunity for a portion of the flooding liquid to find its way into the pump before the projection is seated in a blocking position.

To avoid this disadvantage, a series of vanes is disposed about the base of the flotation piece to be in contact with the inner chamber wall and to reduce the surface of the base in contact therewith. The minimum number of vanes which can serve to guide the projection is three, although additional vanes may be used to provide further stability. In order to further enhance this aspect of the invention, the vanes can have a tapered configuration, having only a ridge line contact with the inner wall of the chamber.

As described above, the flotation piece is activated and caused to seal off the passage to the pump by the flooding of the chamber containing the flotation piece. In a particular embodiment of this invention a filter element is disposed in the path of fluid flow through the present automatic shut-off valve, prior to the chamber containing the flotation piece. Any suitable material may be employed, so long as it has no reactive nature regarding the fluids passing therethrough, e.g., fine glass wool, paper, reticulated polyurethane foams, felt and the like. It is desirable that the filter material have a porosity such that the gaseous material passing therethrough is substantially not obstructed and no substantial pressure drop is noted through the present valve.

This is, however, not a critical requirement and one which may be sacrificed to some extent in the totality of the overall system. For example, should the liquid being moved by the vacuum system be known to contain particular matter which, if allowed to come into the chamber containing the flotation piece, would possibly cause the flotation piece to jam in the chamber and fail to operate properly, the filter material would of necessity be very compact, notwithstanding some loss in suction.

In a particular utilization of the present invention for use in hospitals and related medical facilities, it has been found that felt is a desirable filter medium since it serves to prevent bubbles and solid particulate matter often found in blood from passing into the flotation chamber.

In a particularly refined embodiment of the present invention, a means is also provided to by-pass the automatic flotation shut off. In some applications, for example during an operation, it may be more important that the function of the vacuum system be continued, notwithstanding any damage to the pump or any other consideration. The by-pass is designed to be rapidly and easily activated.

The by-pass is normally in a closed position during the operation of the vacuum system. When the automatic shut off has been carried out by flooding of the present valve and seating of the projection on the flotation piece in the passage to the pump, the operator can immediately by-pass the valve by a simple turn of a handle which will cause a slightly compressed ball closure to be rolled out the opening of a secondary passage connecting the inlet on the present automatic shut-off valve to the vacuum pump. The shut-down of the system can thus be reduced to only a few seconds.

In a further refinement of the present invention, the inlet and outlet to the present automatic shut-off valve consists of two conduits extending exteriorly of the housing of the valve, each of which has an enlarged end portion, being adapted to be connected into the vacuum system by means of an expandable tube on each conduit which can be rapidly removed to facilitate removing and replacing a valve which has been activated.

An an alternative to replacing an activated or used valve, each valve can be equipped with a drain and replaceable filter.

In addition to being utilized in direct relationship with a vacuum pump, the present invention can be employed in a community-type vacuum system, such as are often found in hospitals and laboratories. The introduction of liquids into a community system can be even more troublesome than the fouling of a single pump. The conduits of a community system are within building walls, and a fluid such as blood can coagulate within the conduits of the community system, substantially reducing its effectiveness or disabling the entire system.

It is an advantage of the present invention that a vacuum or suction system employed to move or remove liquids can be protected from inadvertent flooding of said system. It is a particular advantage of the present invention that a vacuum pump adapted to operate with gas can be protected from flooding by liquids. It is a particular advantage of the present invention that the protection afforded against flooding is automatic.

It is a further advantage of the present invention that it is adapted to be employed in hospitals to protect property and improve the dependability of hospital equipment with which it is employed.

In one aspect, the present invention provides an automatic cut-off to prevent flooding of a vacuum system in combination with an elective by-pass. Another aspect of the present invention is the ease of activating the elective by-pass. A further aspect of the present invention is the ease of replacing the activated or used automatic valve with a new automatic valve.

Other aspects and advantages of the present invention will be apparent from the following description of the invention and from the drawings.

DETAILED DESCRIPTION OF THE INVENTION AND SPECIFIC EMBODIMENTS

In the following description of the drawings the same numerical designation has been used in each figure to indicate the same part.

In FIG. 1 is seen an overall view of a suction system employing the automatic shut-off valve 21 according to the present invention, between the vacuum pump 20 and the remainder of the suction system which is comprised of a line 22 from the patient or point where liquid is being siphoned into the collection section 23, which is connected to the automatic shut-off valve 21 via tubing 24.

Referring now to FIG. 2, an enlarged cross sectional view of a particular embodiment of the present automatic shut-off valve is shown, having an outer housing comprised of a lower outer housing 30 and an upper outer housing 32 which are joined either permanently by means of a weld or solder or other conventional means of connection. The outer housing as well as the majority of the other parts described hereinafter may be made of plastic material, and in such case lower outer housing 30 and upper outer housing 32 may be joined by means of a contact cement or other suitable solvent-type cement normally employed to seal plastic to plastic. The outer housing and the other portions of the apparatus may also be prepared from other materials such as stainless steel. The selection of the particular material employed will depend in great part upon the use and convenience aspect in the use of the valve. For example, in many applications it may be desirable to have a disposable valve, in which case the automatic shut-off valve and as many parts as possible would preferably be fabricated from a plastic material in order to reduce the overall cost of the device.

Upper outer housing 32 has an inlet conduit 34 and an outlet conduit 31, each of said conduits having an enlarged rounded end 35 and 33, respectively. This arrangement for inlet and outlet is designed to facilitate and speed connecting and disconnecting the automatic shut-off valve of the present invention into a vacuum line, by means of a flexible tube which is forced onto the external portion of conduits 34 and 31, respectively, and which is held in place by the enlarged rounded ends thereof.

Inlet conduit 34 connects into an internal conduit 37 which opens into annular space 39. Situated in a portion of annular space 39 is a filter material 38 which fills the lower three-quarters of the annular space 39. Annular space 39 is formed between lower outer housing 30 and wall 51. Filter material 38 rests on annular disc 40 which is supported by shoulder 57 extending from the internal portion of lower outer housing 30. About the surface of annular disc 40 is a series of openings 56, which open into an annular chamber 43. Annular chamber 43 is formed by lower outer housing 30 and wall 51 and wall 72 (see FIG. 4). In the upper part of wall 51 openings 45 are provided into an inner chamber formed in its upper portion by wall 51 and at the bottom by wall 72 (see FIG. 2). This particular configuration is a result of a fabrication technique wherein wall 51 is formed in conjunction with upper outer housing 32 and wall 72 is formed in conjunction with lower outer housing 30. In this particular embodiment, there is a small annular slit 42 between wall 51 and wall 72. In addition, there are ports 41 from annular chamber 43 into the inner chamber, through wall 72 into the inner chamber. The upper end of the inner chamber formed by wall 51 opens into a conduit 52 which leads to outlet conduit 31.

At the opening to conduit 52 is a resilient member 53 having an opening 54 therein, whose function will be described in more detail in regard to the flotation piece 44 and its function. Flotation piece 44 is composed of two principal elements, a base 46 and a bullet-shaped projection 47 rising from the base. Flotation piece 44 is formed to have an internal cavity 50 extending from the base 46 through the bullet-shaped projection 47, being closed at all points except the very terminal end of the base 46. The bullet-shaped projection is situated in the chamber formed by wall 51 so as to be in operable alignment with opening 54 in resilient member 53. Situated about base 46 are a series of vanes 48 designed to space the flotation piece 44 a fixed or substantially fixed distance from wall 51. Situated along the upper portion of the bullet-shaped projection 47 are a series of barbs 49.

Immediately above and communicating with internal conduit 37 is cavity 60. The cover 61 is rotatably situated in a cavity at the top of upper outer housing 32 and held securely in place by means of a flange 63 on said upper outer housing engaging a shoulder 55 on cover 61. Said cavity 60 communicates with conduit 52 and hence outlet conduit 31 by means of conduit 65, which is normally closed by means of a ball valve situated in annular lips 67 at the upper end of said conduit 65 and projecting into cavity 60. The ball valve 64 is held in place by an opposed annular lip 66 situated on cover 61 and extending into cavity 60 opposite annular lip 67. Ball valve 64 is preferably made of a slightly resilient material which is compressed by the two annular lips to form a tight seal, so that in normal operation there is no operable passage connecting through cavity 60 and conduit 65. Thus, the total vacuum is pulled through inlet conduit 34, internal conduit 37, filter 39, opening 56, annular chamber 43, opening 45, the inner chamber formed by wall 51, opening 54, conduit 52 and outlet conduit 31. Cover 61 is against seal 68 which is to further ensure that no vacuum is lost through the cover area.

Immediately above a brief description was provided of the flow of the gaseous material through the present valve in its normal operating condition. In order to fully appreciate the operation of the present invention, a more detailed description of its operation will now be given. For the purpose of illustration, referring to FIG. 1, assume that the valve shown in FIG. 2 were inserted as 21 in the line. The gaseous material being handled is atmosphere oxygen and the fluid may be, for example, blood. The vacuum pump maintains a suction from the patient by pulling air through inlet conduit 34 into internal conduit 37, hence into the annular space 39 and through the filter material 38, hence through opening 56 into the annular chamber 43. The air will then flow from a negative pressure of the pump through opening 45. At this point, opening 41 has no function and it is unlikely that any substantial amount of air flow will pass therethrough. If should be noted that opening 45 is situated above the base portion of the flotation piece in order to avoid the possibility that the air would force the flotation piece upward. It should also be noted that the openings 41 are very small and somewhat obstructed by the base portion 46 of flotation piece 44. Thus, the easiest path of flow for the air being pulled by the vacuum pump is through opening 45. The barbs 49 are fin-shaped and offer very little resistance to the air. Generally, there will be only two such barbs placed at each selected diameter of the bullet-shaped projection 47. The air continues its path through opening 54 in the resilient member 53 into conduit 52 and hence out through outlet conduit 31 into the pump. The lower portion of projection 47 to the point where it joins base 46 is a concave curve to further facilitate the flow of air.

Referring again to FIG. 1, should both collection vessels shown in collection section 23 become filled with a liquid, the vacuum pump 20 will draw the liquid via line 24 into the automatic shut-off valve 21. Referring now to FIG. 4, it can be seen that the liquid will pass in through the inlet conduit 34 into internal conduit 37, hence through the filter material and opening 56 into annular chamber 43. The liquid 70 in annular chamber 43 will initially pass through openings 41 and annular slit 42 into the lower part of the chamber formed by walls 51 and 72, thus buoying up flotation piece 44. The vanes 48 will guide the flotation piece 44 upward and at the same time reduce the tendency of capillary attraction between the walls 51 and the flotation piece 44. In this embodiment the flotation piece is driven upward through opening 54 into conduit 52. Resilient member 53 expands to allow the bullet-shaped projection 47 to pass through. The length to which the bullet-like projection will be driven into conduit 52 will depend in part on the speed at which the pump is being operated and the speed with which the liquid 70 is fed into annular chamber 43. The opening in resilient member 53 is large enough to allow a portion of the bullet-shaped projection to enter. Thus, regardless of the extent to which the projection is driven into conduit 52, a tight seal will be formed by the restricting action of resilient member 53. The barb 49 immediately above the resilient member 53 will serve to prevent the bullet-shaped projection 47 from being dislodged and forced back down into the chamber formed by wall 51, thus providing a fail-safe shut-off valve.

Figure 5:
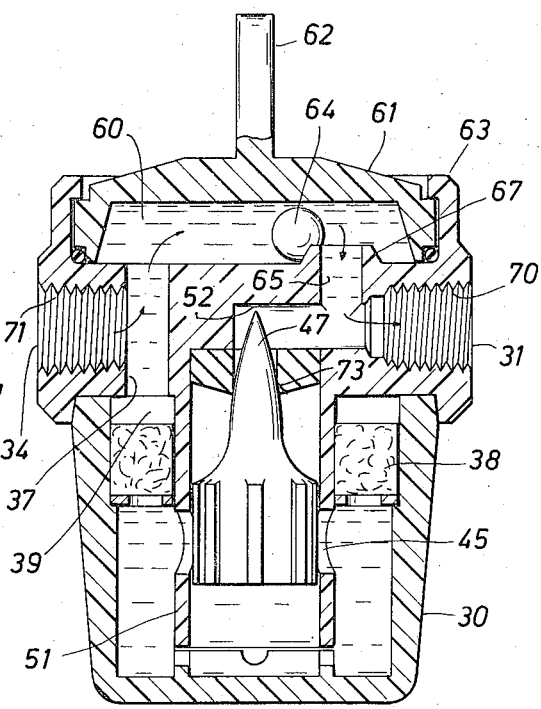
FIG. 5 is an enlarged cross sectional view of another embodiment of the present invention.
Figure 6:
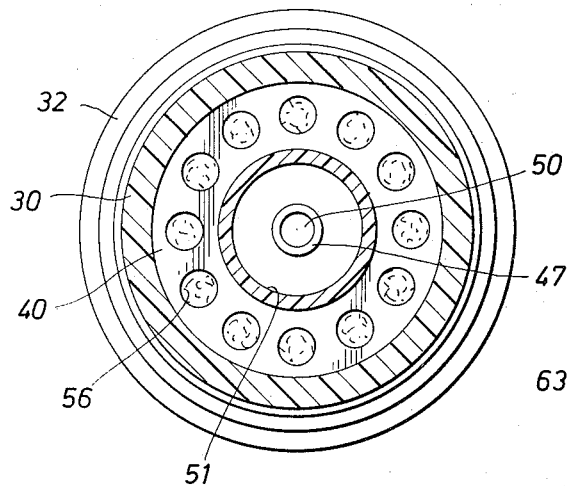
FIG. 6 is a transverse cross sectional view taken along line 6—6 of FIG. 2.
Figure 7:
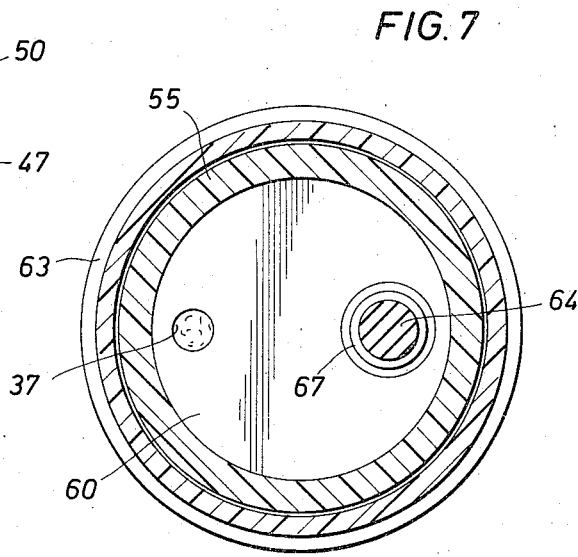
FIG. 7 is a transverse cross sectional view taken along line 7—7 of FIG. 2.

However, should it be desirable that the suction be maintained, notwithstanding the fact that the pump will be flooded, the present automatic shut-off valve contains an easily activated by-pass system, as shown in FIG. 5. This system is activated by rotating handle 62, thus causing cover 61 to move and to roll ball valve 64 out of the annular lip 76 and the opening to conduit 65. The liquid can then pass in through inlet conduit 34 through cavity 60 and conduit 65 and out through outlet conduit 31.

FIG. 5 also shows a different embodiment of the present invention in that instead of an externally protruding inlet and outlet conduit 34 and 31, respectively each of these conduits is provided with an internal thread to receive a suitable standard size nipple. Furthermore, the bullet-shaped projection 47 is not equipped with barbs but is driven into and held by the wall 73 of conduit 52. This arrangement has certain advantages. It is possible to drain the fluid in annular chamber 43 by a cock (not shown) and to apply a back pressure through outlet conduit 31 to force the bullet-shaped projection 47 and the entire flotation piece 44 back into its original position as shown in FIG. 2. Additionally the lower housing 30 may be disconnected from the upper housing 32 and the filter material 38 replaced with fresh filter material.

It should be recognized that the foregoing description covers preferred embodiments and that changes in sizes, shapes or arrangements of elements may be made without departing from the scope of the invention as described hereinbefore.

What is claimed is:

1. An automatic shut-off valve comprising:
 a housing,
 an inlet in said housing communicating with a flotation chamber,
 an opening at the top of said flotation chamber,
 a flotation piece positioned below and in operable alignment with said opening,
 means to guide said flotation piece into cooperative engagement with said opening,
 barb means on said flotation piece for securing said flotation piece in said opening, and
 an outlet in said housing communicating with said opening.

2. The automatic shut-off valve according to claim 1 wherein said inlet communicates with said flotation chamber through a first chamber.

3. The automatic shut-off valve according to claim 2 wherein a filter material is disposed in a portion of said first chamber.

4. The automatic shut-off valve according to claim 3 wherein said flotation chamber is cylindrical, and said first chamber is annularly disposed about said flotation chamber.

5. The automatic shut-off valve according to claim 4 wherein the filter material is disposed annularly about the upper portion of said first chamber.

6. The automatic shut-off valve according to claim 5 wherein said first chamber communicates with said flotation chamber at a point below said filter material.

7. The automatic shut-off valve according to claim 1 wherein
 said inlet in said housing communicates with said flotation chamber, said flotation chamber having a cylindrical configuration, through an annular first chamber disposed about said flotation chamber, said annular first chamber having a filter material annularly disposed about an upper portion thereof, said flotation piece is hollow and has an enlarged base and an upwardly projecting member, said base having a plurality of vanes disposed vertically thereon, said upwardly projecting member having a series of barbs on the surface thereof, and
 a by-pass disposed at the top of said housing, said by-pass communicating said inlet and said outlet and having disposed in and obstructing said by-pass a movable ball valve.

8. The automatic shut-off valve according to claim 7 wherein said annular first chamber communicates with said flotation chamber through a plurality of openings located below said filter material.

9. The automatic shut-off valve according to claim 8 wherein said movable ball valve is held in an opening interposed between said inlet and said outlet by a rotatable cover seated in said housing.

10. The automatic shut-off valve according to claim 9 wherein said filter material is felt.

11. An automatic shut-off valve comprising
 a housing,
 an inlet in said housing communicating with a flotation chamber,
 an opening at the top of said flotation chamber,
 a flotation piece positioned below and in operable alignment with said opening,
 means to guide said flotation piece into cooperative engagement with said opening,
 an outlet in said housing communicating with said opening, and
 a by-pass communicating with said inlet and said outlet and having disposed in and obstructing said by-pass a rollably movable ball valve, held in an opening interposed between said inlet and said outlet by a rotatable cover, said cover being seated in said housing.

12. The automatic shut-off valve according to claim 11 wherein said flotation piece has barb means on the surface thereof for securing said flotation piece in said opening.

13. The automatic shut-off valve according to claim 12 wherein said flotation piece comprises an enlarged base and an upwardly projecting member.

14. The automatic shut-off valve according to claim 13 wherein said flotation piece is hollow.

15. In a vacuum system for use in collecting liquids, comprising a vacuum source, a line connecting said vacuum source to a liquid collection section and a line connecting said liquid collection section to a point from which liquid is to be collected, wherein the improvement comprises interposing in the line connecting said vacuum source and said liquid collection section an automatic shut-off valve comprising:
 a housing,
 an inlet in said housing communicating with a flotation chamber,
 an opening at the top of said flotation chamber,
 a flotation piece positioned below and in operable alignment with said opening,
 means to guide said flotation piece into cooperative engagement with said opening,
 an outlet in said housing communicating with said opening, and
 a by-pass communicating with said inlet and said outlet and having disposed in and obstructing said by-pass a rollably movable ball valve, held in an opening interposed between said inlet and said outlet by a rotatable cover, said cover being seated in said housing.

16. An automatic shut-off valve comprising,
 a housing,
 an inlet in said housing communicating with a flotation chamber,
 an opening at the top of said flotation chamber, a flotation piece positioned below and in operable alignment with said opening and having an enlarged base and upwardly projecting member, said upwardly projecting member has provided on the surface thereof barb means, for securing said flotation piece in said opening, means to guide said flotation piece into cooperative engagement with said opening, and an outlet in said housing communicating with said opening.

17. The automatic shut-off valve according to claim 16 wherein said flotation piece is hollow.

18. The automatic shut-off valve according to claim 17 wherein the upwardly projecting member is adapted to mate with and obstruct said opening.

19. The automatic shut-off valve according to claim 17 wherein the means to guide said flotation piece comprises a plurality of vanes disposed vertically about the base of said flotation piece.

20. The automatic shut-off valve according to claim 16 wherein said opening at the top of the flotation chamber is covered by a resilient member having an opening in operable alignment with said flotation piece.

21. The automatic shut-off valve according to claim 16 wherein said barb means comprises a series of frusto-conical bands.

22. An automatic shut-off valve comprising a housing, an inlet in said housing communicating with a flotation chamber, an opening at the top of said flotation chamber, a flotation piece positioned below and in operable alignment with said opening, means to guide said flotation piece into cooperative engagement with said opening, an outlet in said housing communicating with said opening, and a by-pass communicating with said inlet and said outlet and having disposed in and obstructing said by-pass a rollably movable valve means held in an opening interposed between said inlet and said outlet by a rotatable cover, said cover being seated in said housing.

* * * * *